United States Patent
Miyata (10) Patent No.: US 8,441,699 B2
(45) Date of Patent: May 14, 2013

(54) IMAGE FORMING DEVICE HAVING COLOR DENSITY CORRECTION

(75) Inventor: Yuji Miyata, Kitanagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 1002 days.

(21) Appl. No.: 12/485,171

(22) Filed: Jun. 16, 2009

(65) Prior Publication Data

US 2010/0027036 A1    Feb. 4, 2010

(30) Foreign Application Priority Data

Jul. 31, 2008    (JP) .................................. 2008-197505

(51) Int. Cl.
*H04N 1/46* (2006.01)
*H04N 1/60* (2006.01)

(52) U.S. Cl.
USPC .......................................... 358/504; 358/1.9

(58) Field of Classification Search ............... 358/1.9, 358/406, 504, 3.02, 3.23, 1.14, 1.15, 1.16; 399/27, 399/29, 252–254
See application file for complete search history.

(56) References Cited

U.S. PATENT DOCUMENTS

| 7,271,935 B2 * | 9/2007 | Coons et al. ................... 358/2.1 |
| 2005/0123313 A1 | 6/2005 | Saito |
| 2005/0276619 A1 | 12/2005 | Taguchi et al. |

FOREIGN PATENT DOCUMENTS

| JP | 2002-108141 | 4/2002 |
| JP | 2004-306386 | 11/2004 |
| JP | 2005-62414 | 3/2005 |
| JP | 2005-196128 | 7/2005 |
| JP | 2005-352376 | 12/2005 |

* cited by examiner

*Primary Examiner* — Thomas Lett
*Assistant Examiner* — Sunil Chacko
(74) *Attorney, Agent, or Firm* — Scully, Scott, Murphy & Presser, P.C.

(57) ABSTRACT

An image forming device includes an image forming unit forms an image based on image data by using at least one of a plurality of colors of developer. A test image forming unit controls the image forming unit to form a test image based on test image data. A measuring unit measures density of the test image. A color density correction data creating unit creates the color density correction data based on the measured density. A color order setting unit sets a color order. A performing unit performs a process to create color density correction data for the plurality of colors in the color order by controlling the test image forming unit, the measuring unit, and the color density correction data creating unit. A print image data acquiring unit acquires print image data while the performing unit is performing a color density correction data creating process for a current color.

15 Claims, 8 Drawing Sheets

FIG.9

IMAGE FORMING DEVICE HAVING COLOR DENSITY CORRECTION

CROSS REFERENCE TO RELATED APPLICATION

This application claims priority from Japanese Patent Application No. 2008-197505 filed May 31, 2008. The entire content of this priority application is incorporated herein by reference.

TECHNICAL FIELD

The present invention relates to an image forming device.

BACKGROUND

With conventional image-forming devices, such as color laser printers, it is known that changes in the properties of developer and photosensitive members in the image-forming device caused by deterioration overtime, changes in ambient temperature, and other factors lead to fluctuations in the densities of images formed by the device.

The following method can be employed to compensate for such fluctuations in the image formation properties. First, in order to detect changes in image formation properties, the printer is controlled to form a plurality of test patches in different densities for each color, and to measure the densities of these test patches. Next, a calibration table (referred to as a gamma table) is created based on the results of these measurements. Theses processes for forming the color density correction table is often referred to as calibration. Using this correction table, the printer can correct variations in image formation properties.

When actually checking for variations in image formation properties, the printer forms test patches on a photosensitive belt or a conveying belt, scans the printed results on the belt with a sensor, and creates correction data based on the scanned results. When performing the above operation for various densities in each color, the number of steps required to create correction data for calibrating color densities can be numerous and the process time-consuming.

If the user issues a print request to the printer while the printer is executing a process to create color density correction data, the printing process must be put on hold until the correction data can be created. This is an inconvenience to the user of the printer who must wait to receive the printing results.

To overcome the problem described above, a printer suspends the process for creating correction data when a print request is received from the user during the correction data creating process, and executes a printing operation based on another correction data that is stored prior to the current correction data creating process. According to this method, the printer can meet the needs of users who wish to obtain printing results immediately, by interrupting the correction data creating process to respond to a print request. However, despite the color density correcting process to compensate for fluctuations in image formation properties caused by abrupt changes in ambient temperature and the like, the conventional printer uses previous correction data when a print request is received during the color density correction process. By using the previous correction data, the printer cannot accurately compensate for fluctuations in image formation properties and, hence, cannot maintain a high quality in the printed images.

SUMMARY

In view of the foregoing, it is an object of the present invention to provide an image-forming device capable of quickly forming images while maintaining good image quality, even when a request for image formation is received from the user while the image-forming device is executing a color density correction process.

In order to attain the above and other objects, the invention provides an image forming device. The image forming device includes an image forming unit, a test image forming unit, a measuring unit, a color density correction data creating unit, a color order setting unit, a performing unit, a print image data acquiring unit, a to-be-used color determination unit, a first determining unit, and an print image forming unit. The image forming unit is configured to form an image based on image data by using at least one of a plurality of colors of developer. The test image forming unit is configured to control the image forming unit to form a test image based on test image data. The measuring unit is configured to measure density of the test image. The color density correction data creating unit is configured to create the color density correction data based on the measured density. The color order setting unit sets a color order. The performing unit performs a color density correction data creating process to create color density correction data for the plurality of colors in the color order, by controlling the test image forming unit, the measuring unit, and the color density correction data creating unit The print image data acquiring unit is configured so as to be capable of acquiring print image data while the performing unit is presently performing a color density correction data creating process for a current color that is one of the plurality of colors. The to-be-used color determination, unit determines, based on the print image data, a to-be-used color among the plurality of colors of developer, the to-be-used color being a color that should be used for forming a print image based on the print image data, by the image forming unit. The first determining unit determines whether or not the performing unit has already performed the color density correction data creating process for the to-be-used color. The print image forming unit controls the image forming unit to form the print image based on the print image data by using the color density correction data corresponding to the to-be-used color, when the first determining unit determines that the performing unit has already performed the color density correction data creating process for the to-be-used color.

According to another aspect, the present invention provides an image forming method comprising: starting performing a color density correction data creating process for a plurality of colors in a color order, the color density correction data creating process including; controlling an image forming unit to form a test image based on test image data; measuring density of the test image; and creating the color density correction data based on the measured density; acquiring print image data while the color density correction data creating process is being performed for a current color that is one of the plurality of colors; determining a to-be-used color among the plurality of colors of developer based on the print image data, the to-be-used color being a color that should be used for forming a print image based on the print image data by an image forming unit; determining whether or not color density correction data creating process for the to-be-used color has already been performed; and controlling the image forming unit to form the print image based on the print image data by using the color density correction data corresponding to the to-be-used color, when it is determined that the color density correction data creating process for the to-be-used color has already been performed.

According to another aspect, the present invention provides a computer-readable recording medium that stores a data processing program, the data processing program comprising instructions for: starting performing a color density correction data creating process for a plurality of colors in a color order, the color density correction data creating process including; controlling an image forming unit to form a test image based on test image data; measuring density of the test image; and creating the color density correction data based on the measured density; acquiring print image data while the color density correction data creating process is being performed for a current color that is one of the plurality of colors; determining a to-be-used color among the plurality of colors of developer based on the print image data, the to-be-used color being a color that should be used for forming a print image based on the print image data by an image forming unit; determining whether or not color density correction data creating process for the to-be-used color has already been performed; and controlling the image forming unit to form the print image based on the print image data by using the color density correction data corresponding to the to-be-used color, when it is determined that the color density correction data creating process for the to-be-used color has already been performed.

BRIEF DESCRIPTION OF THE DRAWINGS

The particular features and advantages of the invention as well as other objects will become apparent from the following description taken in connection with the accompanying drawings, in which.

DETAILED DESCRIPTION

An image forming device according to embodiments of the invention will be described while referring to the accompanying drawings wherein like parts and components are designated by the same reference numerals to avoid duplicating description.

Figure 1:
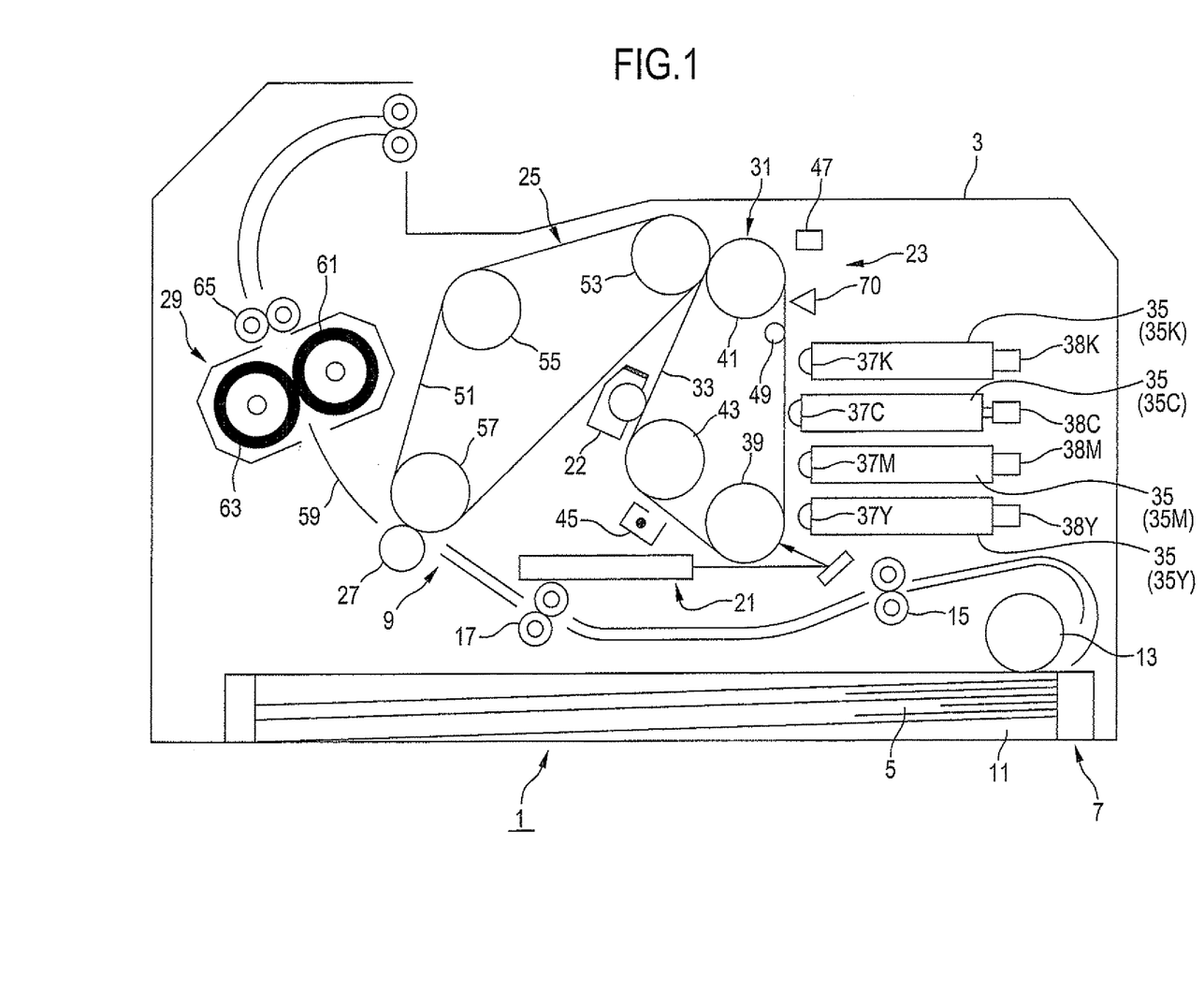
FIG. 1 is a schematic section view showing an image forming device according to illustrative aspects of the invention.

A printing apparatus according to a first embodiment of the present invention will be described using a four-cycle color laser printer by way of example. As shown in FIG. 1, the color laser printer 1 has a main case 3 inside of which are a paper supply unit 7 for supplying paper 5 as the printing medium, and an image forming unit 9 for forming a specific image oh the supplied paper 5.

The paper supply unit 7 includes a paper tray 11 for storing a stack of paper 5, a supply roller 13 that contacts the top sheet of paper 5 in the paper tray 11 and rotates to supply one sheet at a time to the image forming unit 9, and transportation rollers 15 and registration rollers 17 for conveying the paper 5 to an image formation position. The image formation position is a transfer position where a toner image on an inter transfer belt (ITB) 51 described below is transferred to the paper 5, and in the first embodiment is the position where the ITB 51 contacts a transfer roller 27 described below.

The image forming unit 9 includes a scanner unit 21, processing unit 23, inter transfer belt assembly 25, transfer roller 27, and fixing unit 29. Located in the center portion of the main case 3, the scanner unit 21 has a laser unit, polygonal mirror, and a plurality of lenses and reflection mirrors not shown. The laser beam emitted from the laser unit based on the image data is passed or reflected by the polygon mirror, reflection mirrors, and lenses in the scanner unit 21 to scan the surface of the organic photoconductor (OPC) belt 33 in the belt photoconductor assembly 31 at high speed.

The processing unit 23 includes the belt photoconductor assembly 31 and a plurality of (four) developer cartridges 35. The four developer cartridges 35, that is, the yellow developer cartridge 35Y holding yellow toner, the magenta developer cartridge 35M holding magenta toner, the cyan developer cartridge 35C holding cyan toner, and the black developer cartridge 35K holding black toner, are rendered at the front inside the main case 3 sequentially in series from bottom to top with a specific vertical gap between the adjacent cartridges 35.

Each of the developer cartridges 35 includes a developer roller 37 (yellow developer roller 37Y, magenta developer roller 37M, cyan developer roller 37C, and black developer roller 37K), a film thickness regulation blade (not shown), a supply roller, and a toner compartment. The developer cartridges 35 are moved horizontally to contact and separate from the surface of the OPC belt 33 by means of respective separation solenoids 38 (yellow separation solenoid 38Y, magenta separation solenoid 38M, cyan separation solenoid 38C, and black separation solenoid 38K).

The developer rollers 37 have a metal roller shaft covered with a roller made from an elastic material, specifically a conductive rubber material. More specifically, the roller part of each developer roller 37 has a two-layer construction including an elastic roller part and a coating layer of which the primary component During development, a specific developer bias relative to the OPC belt 33 is applied to the developer roller 37, and a specific recovery bias is applied during toner recovery. The specific developer bias is +300 V, and the specific recovery bias is −200 V, for example.

A spherical polymer toner of a positively charged nonmagnetic first component is stored in the toner compartment of each developer cartridge 35 as the developer of the respective color (yellow, magenta, cyan, black). During development, the toner is supplied by rotation of the supply roller to the developer roller 37, and is positively charged by friction between the supply roller and developer roller 37. The toner supplied to the developer roller 37 is carried by rotation of the developer roller 37 between the film thickness regulation blade and the developer roller 37, is further sufficiently charged therebetween, and is thus held on the developer roller 37 as a thin layer of a constant thickness. A reverse bias is applied to the developer roller 37 during toner recovery to recover the toner from the OPC belt 33 to the toner compartment.

The belt photoconductor assembly 31 includes a first OPC belt roller 39; second OPC belt roller 41; third OPC belt roller 43; the OPC belt 33 wound around the first OPC belt roller 39, second OPC belt roller 41, and third OPC belt roller 43; an OPC belt charger 45; a potential adder 47; and a potential gradient controller 49.

The inter transfer belt assembly 25 is rendered behind the belt photoconductor assembly 31, and includes a first ITB roller 53, second ITB roller 55, third ITB roller 57, and the ITB 51 wound around the outside of the first to third ITB rollers 53 to 57. The first ITB roller 53 is located substantially opposite the second OPC belt roller 41 with the OPC belt 33 and ITB 51 (further described below) therebetween. The second ITB roller 55 is located diagonally lower than and behind the first ITB roller 53. The third ITB roller 57 is located behind the second ITB roller 55 and opposite the transfer roller 27 with the ITB 51 therebetween.

The ITB 51 is an endless belt made from a conductive polycarbonate or polyimide resin, for example, containing a dispersion of conductive powder such as carbon. The first ITB roller 53, second ITB roller 55, and third ITB roller 57 are arranged in a triangle around which the ITB 51 is wrapped. When the first ITB roller 53 is rotationally driven through intervening drive gears by driving a main motor not shown, the second ITB roller 55 and third ITB roller 57 follow, and the ITB 51 thus travels circularly clockwise around the first to third ITB rollers 53 to 57.

The transfer roller 27 is located opposite the third ITB roller 57 of the inter transfer belt assembly 25 with the ITB 51 therebetween, and is rotationally supported with a conductive rubber roller covering a metal roller shaft. The transfer roller 27 is movable between a standby position where the transfer roller 27 is separated from the ITB 51, and a transfer position where the transfer roller 27 contacts the ITB 51 by a transfer roller separation mechanism not shown. This transfer roller separation mechanism is rendered on both sides of the transportation path 59 in the thickness direction of the paper 5, and presses the paper 5 conveyed through the transportation path 59 to the ITB 51 when set to the transfer position.

The transfer roller 27 is set to the standby position while visible images of each color are sequentially transferred to the ITB 51, and is set to the transfer position when all of these images have been transferred from the OPC belt 33 to the ITB 51 and a color image has thus been formed on the ITB 51. The transfer roller 27 is also set to the standby position during the calibration process.

When in the transfer position, a specific transfer bias relative to the ITB 51 is applied to the transfer roller 27 by a transfer bias application circuit not shown. The fixing unit 29 is located downstream from the inter transfer belt assembly 25, and includes a heat roller 61, a pressure roller 63 for pressing the printing medium to the heat roller 61, and first transportation rollers 65 rendered downstream from the heat roller 61 and pressure roller 63. The heat roller 61 has an outside layer of silicon rubber covering an inside metal layer, and a halogen lamp as the heat source.

The belt photoconductor assembly 31 of the image forming unit 9 is described in further detail below. The first OPC belt roller 39 is located opposite and behind the four developer cartridges 35 at a position below the lowest cartridge, that is, yellow developer cartridge 35Y. This first OPC belt roller 39 is a driven roller that rotates following the drive roller.

The second OPC belt roller 41 is located vertically above the first OPC belt roller 39 at a height above the top cartridge, that is, the black developer cartridge 35K. The second OPC belt roller 41 is a drive roller that rotates when, driven by a main motor not shown by way of intervening drive gears not shown.

The third OPC belt roller 43 is located diagonally behind and above the first OPC belt roller 39. The third OPC belt roller 43 is also a driven roller that rotates following the drive roller. The first OPC belt roller 39, second OPC belt roller 41, and third OPC belt roller 43 are thus arranged in a triangle.

The second OPC belt roller 41 is charged to a potential of +800 [V] by a proximally located potential adder 47 using power from the OPC belt charger 45. The first OPC belt roller 39 and third OPC belt roller 43 are made from a conductive material such as aluminum, contact the base layer of the OPC belt 33, and are connected to a ground terminal not shown. In other words, the first OPC belt roller 39 and third OPC belt roller 43 hold the potential of the OPC belt 33 to ground in the area where the rollers contact the belt.

The OPC belt 33 is wound around the first OPC belt roller 39, second OPC belt roller 41, and third OPC belt roller 43. When the second OPC belt roller 41 is rotationally driven, the first OPC belt roller 39 and third OPC belt roller 43 also rotate, and the OPC belt 33 travels circularly counterclockwise. This OPC belt 33 is an endless belt having a conductive base layer with a thick photosensitive layer formed on one side of the base layer.

The OPC belt charger 45 is located below the belt photoconductor assembly 31 in the neighborhood of the first OPC belt roller 39 at a position upstream of the part of the OPC belt 33 exposed by the scanner unit 21 opposite the OPC belt 33 with a specific gap therebetween so that the OPC belt charger 45 does not contact the OPC belt 33. This OPC belt charger 45 is a scolotron charger for positively charging the belt by generating a corona discharge from a tungsten or other charging wire, and uniformly positively charges the surface of the OPC belt 33.

The potential gradient controller 49 is located between the second OPC belt roller 41 and first OPC belt roller 39, and contacts the base layer of the OPC belt 33 at a position above the black developer cartridge 35K. The potential gradient controller 49 lowers the potential of the base layer to ground at the point of contact.

The printer 1 is also provided with a density sensor 70 for detecting the density of each color formed on the photosensitive belt 33. The density sensor 70 is disposed above the black developer cartridge 35K, which occupies the topmost position among the developer cartridges 35. The density sensor 70 includes a light source fox emitting an infrared light, a lens for irradiating the light emitted from the light source onto the photosensitive belt 33, and a phototransistor for receiving light reflected off the photosensitive belt 33. The printing operation of this color laser printer 1 is described below. The control unit 90 performs the following operations by controlling other parts of the color laser printer 1.

The supply roller 13 applies pressure to the top sheet of paper 5 stored in the paper tray 11 of the paper supply unit 7 such that rotation of the supply roller 13 delivers the paper 5 at a time into the transportation path. The paper 5 is then supplied to the image formation position by the transportation rollers 15 and registration rollers 17. The registration rollers 17 register the position of the paper 5.

After the surface of the OPC belt 33 is uniformly charged by the OPC belt charger 45, the OPC belt 33 is exposed by high speed scanning of the laser beam from the scanner unit 21 based on image data to be printed. Because the charge is removed from the exposed areas, an electrostatic latent image having positively charged parts and uncharged parts is formed on the surface of the OPC belt 33 according to the image data.

The first OPC belt roller 39 and third OPC belt roller 43 also supply current to the base layer of the OPC belt 33 in contact therewith, and thus hold the potential of this contact area to ground. The yellow separation solenoid 38Y then moves the yellow developer cartridge 35Y of the plurality of developer cartridges 35 horizontally to the rear towards the OPC belt 33 on which the electrostatic latent image is formed (i.e., to the left as seen in FIG. 1) so that the developer roller 37 of the yellow developer cartridge 35Y contacts the OPC belt 33 on which the electrostatic latent image is formed.

The yellow toner in the yellow developer cartridge 35Y is positively charged, and thus adheres only to the uncharged areas of the OPC belt 33. A visible yellow image is thus formed on the OPC belt 33. The magenta developer cartridge 35M, cyan developer cartridge 35C, and black developer cartridge 35K are each moved horizontally towards the front, that is, away from the OPC belt 33, by the respective separation solenoids 38M, 38C, 38K, and are thus separated from the OPC belt 33 at this time. The visible yellow image formed on the OPC belt 33 is then transferred to the surface of the ITB 51 as the OPC belt 33 travels and contacts the ITB 51.

A forward bias (+300 V potential) is applied by the power supply of the OPC belt charger 45 to the second OPC belt roller 41 at this time, thereby charging the light sensitive layer of the belt near the second OPC belt roller 41 to a +300 V potential through the intervening conductive base layer. This produces a repulsive force between the positively charged yellow toner and the light sensitive layer, and facilitates transferring the toner to the ITB 51.

An electrostatic latent image is formed for magenta on the OPC belt 33, a visible magenta toner image is then formed, and the visible magenta toner image is transferred to the ITB 51 as described above. The same operation is then repeated for the cyan toner stored in the cyan developer cartridge 35C and the black toner stored in the black developer cartridge 35K, thereby forming a color image on the ITB 51.

The color image formed on the ITB 51 is then transferred at once to the paper 5 by the transfer roller 27 set to the transfer position as the paper 5 passes between the ITB 51 and transfer roller 27.

The heat roller 61 then thermally fixes the color image transferred to the paper 5 as the paper 5 passes between the heat roller 61 and pressure roller 63. The transportation rollers 65 then convey the paper 5 on which the color image was fixed by the fixing unit 29 to a pair of discharge rollers. The discharge rollers then discharge the paper 5 conveyed thereto onto an exit tray formed on the top of the main case 3. The color laser printer 1 thus prints a full-color image onto the paper.

Figure 2:
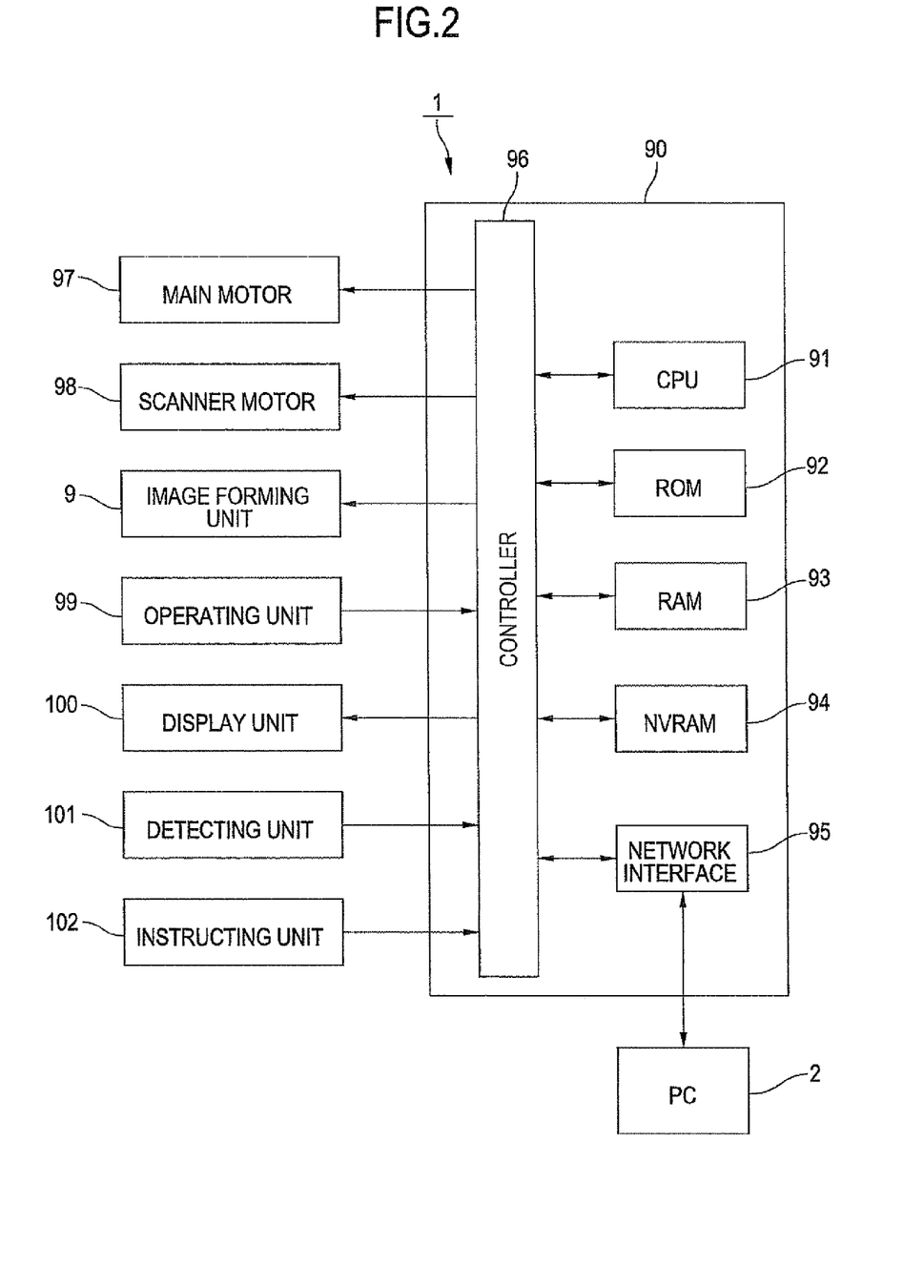
FIG. 2 is a diagram showing an electrical configuration of the image forming devices.

As shown in FIG. 2, a control unit 90 is built around a common microcomputer having a CPU 91; ROM 92; RAM 93; non-volatile memory (NVRAM) 94; and controller 96 configured to ASIC, and controls operation of the color laser printer 1 based on a program stored in ROM 92 and RAM 93. The controller 96 is connected to a main motor 97, scanner motor 98, operating unit 99 as an input panel, display unit 100, detecting unit 101 determining a detection result detected by the density sensor 70, and instructing unit 102 directing the control unit 90 to perform a color density calibration process. The instructing unit 102 has a temperature sensor (not shown).

The CPU 91 performs overall control of the laser printer 1. The ROM 92 stores various control programs for controlling the laser printer 1; various settings; and default values. The RAM 93 is used as work area for reading the control program, and is used as storage area for storing a color density color density correction data and image data, temporally. The NVRAM 94 is a nonvolatile storing memory that stores various settings data, image data, and color density color density correction data. The ROM 92, RAM 93, and NVRAM 94 are connected to the CPU 91 via bus lines. The CPU 91 controls each component to perform processes in accordance with the control program stored in the ROM 92, and stores the processing results into the RAM 93 and NVRAM 94.

The main motor 97 drives the second belt photosensitive member roller 41, the first intermediate transfer belt roller 53, and the like described above to rotate in synchronization. The scanner motor 98 drives a polygon mirror and the like in the scanning unit 21 to rotate. The CPU 91 controls driving of the main motor 97 and scanner motor 97 based on the control program stored in the ROM 92. The controller 96 controls the image forming unit 9 based on the instruction received from the CPU 91. Specifically, the controller 96 controls the scanner unit 21 to expose the surface of the OPC belt 33, and controls transfer bias for transferring the toner to the ITB 51.

Further, the network interface 95 functions to connect the control unit 90 to an external device, such as the PC 2. The CPU 91 performs a process for forming the image on the recording sheet 5 based on the image data inputted from the PC 2 via the network interface 95. The detecting unit 101 detects the detection result detected by the density sensor 70 and is connected to the controller 96.

The instructing unit 102 instructs the CPU 91 to perform a color density correction data creating process via the controller 96, when control unit 90 determines that the color density correction data creating process should be performed based on the detection result by the temperature sensor (not shown) and an elapsed time since the last time at which the color density correction data creating process was performed.

Figure 3:
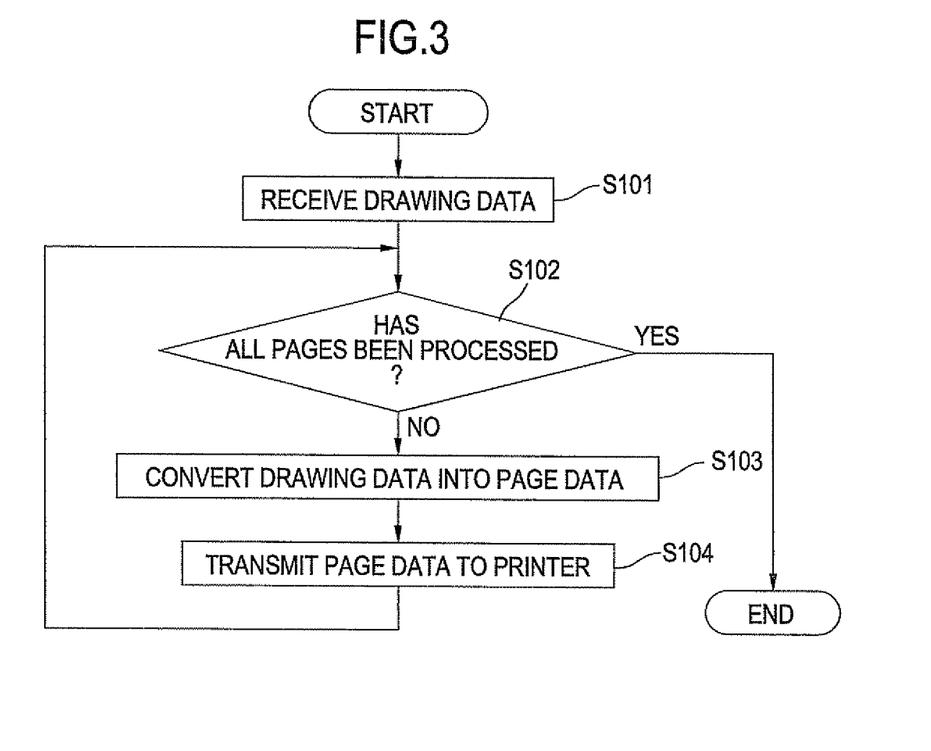
FIG. 3 is a flowchart describing a process executed in an image processing device.

A process executed by the PC 2 will be described with reference to FIG. 3. As shown in FIG. 3, in S101 the printer driver of the PC 2 receives drawing data created with an application on the PC 2. The drawing data corresponds to an image data containing a plurality of sets of page data. Each page data is one page's worth of image data and is created by converting the drawing data. In S102 the printer driver determines whether all page data has been processed. When the printer driver of PC 2 determines that there remain page data to be processed (S102: NO), in S103 the printer driver creates one page data (one page's worth of image data) by converting color values contained in the drawing data to density values of cyan (C), magenta (M), yellow (Y), and black (K), each density value being within a range of 256 levels. And then, in S104 the printer driver of PC 2 transmits the page data for one page's worth to the printer 1. When the process has been completed for all page data (S102: YES), the printer driver of PC 2 ends the process.

Next, a main process according to the first embodiment executed by the printer 1 will be described with reference to FIGS. 4 through 8. As described above, the printer 1 is capable of performing color-printing process by using four colors of toner (C, M, Y, and K) to perform multiple tone printing using 256 levels for each color.

Figure 4:
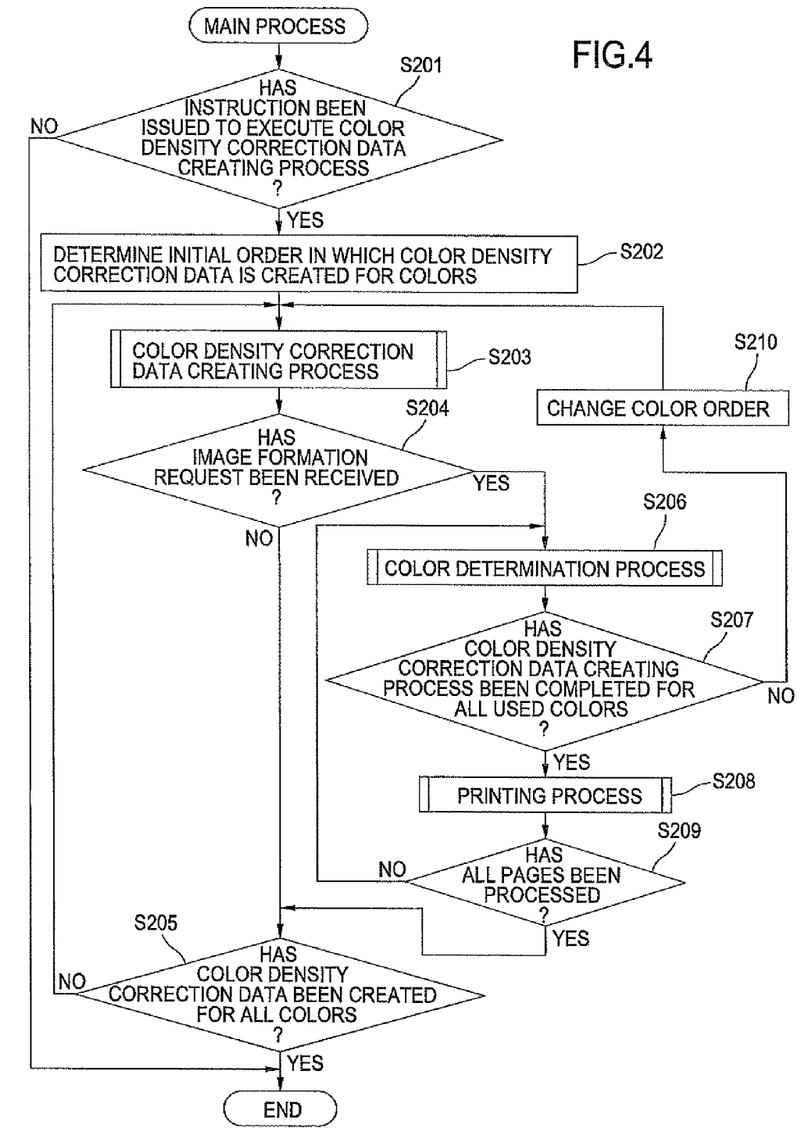
FIG. 4 is a flowchart describing a main process executed in the image forming device according to a first embodiment.

In S201 at the beginning of the main process in FIG. 4, the control unit 90 determines whether or not an instruction to execute the color density correction data creating process has been issued. When the control unit 90 determines that the instruction was not received (S201: NO), the control unit 90 ends the main process. However, when the control unit 90 determines that the instruction was received (S201: YES), the control unit 90 advances to S202.

In the printer 1 according to the first embodiment, an instruction to execute the color density correction data creating process is issued as follows. If the user recognizes the need to perform color density correction, the user can issue the instruction to the printer 1 by using the PC 2, instructing the printer 1 to create color density correction data. Alternatively, the user can issue the instruction to create color density correction data by operating the input panel on the operating unit 99 provided in the printer 1. The instructing unit 102 of the printer 1 may also issue an instruction to create color density correction data when the temperature sensor provided in the printer 1 detects an abrupt change in temperature or when the control unit 90 determines that a prescribed time has elapsed after the control unit 90 performed the process to create color density correction data previous time.

In S202 the control unit 90 determines an initial color order in which color density correction data is created for each color. In other words, the color order indicates an order of colors for which color density correction data creating process described later should be performed. In the main process according to the first embodiment, since the control unit 90 produces color density correction data for four colors of toner (C, M, Y, and K), the control unit 90 sets the color order of four color (C, M, Y, and K) in accordance to the initial color order stored in the RAM 93 or NVRAM 94. In the first embodiment, the control unit 90 sets the color order of C, M, Y, and K as the initial color order.

In S203 the control unit 90 performs a color density correction data creating process (described later) for the first color C. In S204 the control unit 90 determines whether or not an image formation request was received from the PC 2. When the printer driver on the PC 2 transmits one page data at a time, the control unit 90 determines that the image formation request is received from the PC 2 when the receives one page's worth of image data. When the control unit 90 determines that the image formation request was not received (S204: NO), in S205 the control unit 90 determines whether or not color density correction data has been created for all colors C, M, Y, and K. When the control unit 90 determines that color density correction data has not been created for all colors (S205: NO), the control unit 90 returns to S203 and continues creating color density correction data for the remaining colors (M, Y, and K) in the initial color order set in S202.

Next, the color density correction data creating process for cyan (C) will be described with reference to FIG. 5. The process is identical for the colors M, Y, and K. In S301 of FIG. 5, the control unit 90 instructs the image forming unit 9 to form one density patch contained in a density patch set 32 for cyan on the photosensitive belt 33. As shown in FIG. 6, the density patch set 32 is configured of density patches C0-C8 of differing densities (the patches are formed in an arbitrary shape, each patch having a uniform density) that are formed in a continuous line. The length of the density patch set 32 is small enough to fit within one cycle of the photosensitive belt 33 in the circulating direction of the photosensitive belt 33. The nine density patches C0-C8 shown in FIG. 6 correspond to color levels (densities) 0, 32, 64, 96, 128, 160, 192, 224, and 255. Hence, the color tone values corresponding to the density patches C0-C8 are set to values distributed equally within the range of color levels (densities) 0-255.

Returning to FIG. 5, in S302 the control unit 90 controls the density sensor 70 to measure the actual density of the density patch formed in S301. Subsequently, the control unit 90 determines whether or not the processes of S301 and S302 have been completed for all densities (0, 32, 64, 96, 128, 160, 192, 224, and 255). When the control unit 90 determines that the processes have not been completed for all densities (S303: NO), the control unit 90 returns to S301 and repeats the processes of S301 and S302 for next density patch described above. When the control unit 90 determines that the processes of S301 and S302 have been completed for all densities, in other words, when the density patch set 32 shown in FIG. 6 has been completely formed and the densities for nine patches have been measured (S303: YES), the control unit 90 advances to S304.

Through the processes in S301-S303 described above, the control unit 90 forms the density patch set 32 on the photosensitive belt 33 as the photosensitive belt 33 circulates, and measures the densities of patches by the density sensor 70. The control unit 90 stores the measured densities in the RAM 93, or NVRAM 94, as measurement results.

In S304 the control unit 90 creates color density correction data based on the densities for the density patch set 32 measured in S302. Using the actual output levels (densities measured by the density sensor 70), the control unit 90 finds correction values for the input levels (tone values) corresponding to the nine density patches measured in S302 in order to produce ideal output levels. Although only nine density patches C0-C8 are formed, the control unit 90 also determines correction values for the 247 input levels other than the nine densities corresponding to the density patches C0-C8 by using an algorithm to perform interpolation on the nine known correction values. In this way, the control unit 90 determines correction values corresponding to all 0-255 input levels, and creates color density correction data for cyan indicating the correction values. In S305 the control unit 90 stores the color density correction data in the RAM 93 or NVRAM 94.

Returning to FIG. 4, when the control unit 90 determines that color density correction data has been created for all colors C, M, Y, and K (S205: YES), the control unit 90 ends the main process.

Next, processes of S204 through S210 will be described in a case the control unit 90 determines that an image formation request is received from the PC 2 during the color density correction data creating process.

As described above, the control unit 90 determines in S204 whether or not an image formation request was received from the PC 2 after completing the color density correction data creating process in S203. If the control unit 90 determines that an image formation request was not received (S204: NO), the control unit 90 continues creating the color density correction data as described above. However, when the control unit 90 determines that an image formation request was received from the PC 2 (S204: YES), the control unit 90 advances to S206.

When the image formation request is received from the PC 2 during the color density correction data creating process for a certain color in S203, the control unit 90 determines in S204 whether or not an image formation request is received after completing the current color density correction data creating process for the certain color. Therefore, by reliably completing the color density correction data creating process, the printer 1 can more effectively create color density correction data without wasting data created for a color by interrupting the color density correction data creating process.

Next, the color determination process of S206 will be described with reference to FIG. 7. Through the color determination process, the control unit 90 determines at least one to-be-used color among the colors C, M, Y, add K. The to-be-used color is a color that should be used for forming an image for one page based on the image data.

In S401 at the beginning of the color determination process, the control unit 90 receives page data created on the PC 2. As described above, the page data received from the PC 2 is one page's worth of image data created in S103 by the printer driver of PC 2 (see FIG. 3). The page data has a density expressing 256 tone levels for each color C, M, Y, and K. The each color C, M, Y, and K are defined as primary colors in the CMYK color model.

Since the CMYK color model uses subtractive colors that are superimposed according to the subtractive method for rendering colors, black can be formed by mixing same amount of the primary colors C, M, and Y. In the CMYK color space, secondary colors such as red (R), green (G), and blue (B) are produced by mixing the primary colors C, M, Y, and K. For example, the secondary color R can be produced by mixing the primary colors Y and M, the secondary color G can be produced by mixing the primary colors Y and C, and the secondary color B can be produced by mixing the primary colors C and M.

Some page data can be rendered with only one or two primary colors (C, M, Y, or K) depending on the type of page data, such as page data configured of data representing only black (monochrome) and page data configured of data representing only black and red. For example, the image data is configured to form an image corresponding to a document having black text with red lines highlighting key sections.

In S402 the control unit 90 determines at least one to-be-used color among the primary colors C, M, Y, and K, based on the to-be-used color information, by analyzing a plurality of sets of data that constitute the page data received from the PC 2. The to-be-used color is at least one of the primary colors that should be used when the image forming unit 9 forms an image based on the page data. For example, the control unit 90 determines K as the to-be-used color when a page corresponding to the page data is configured of only black; and K, Y, and M as the to-be-used colors when a page corresponding to the page data is configured of black and red. The control unit 90 stores to-be-used color information indicating the to-be-used colors for the page data in the NVRAM 94 (see FIG. 2).

Figure 7:
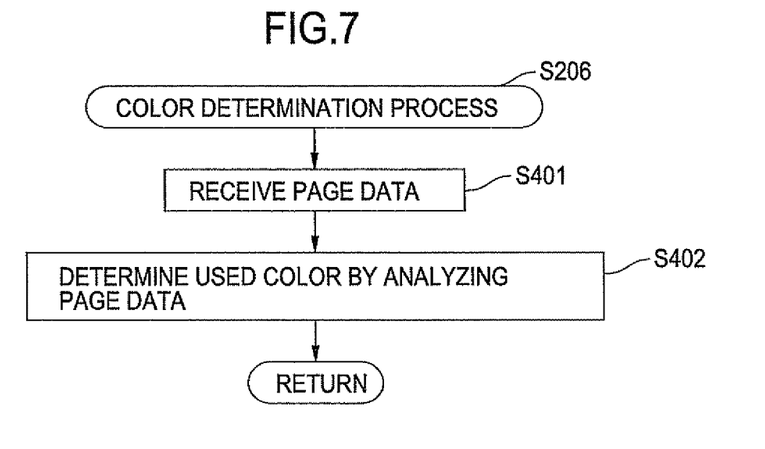
FIG. 7 is a flowchart describing a color determination process in the main process.

Returning to FIG. 4, in S207 the control unit 90 determines whether or not color density correction data has been created for the to-be-used colors determined b the color determination process of FIG. 7. When the control unit 90 determines that the color density correction data creating process has been completed for all to-be-used colors (S207: YES), in S208 the control unit 90 performs a printing process described later.

However, if the control unit 90 determines that color density correction data creating process has not yet been performed for all to-be-used colors (S207: NO), then in S210 the control unit 90 changes and resets the color order in which the control unit 90 creates color density correction data so that the priority is given for the to-be-used colors. In other words, the control unit 90 resets the color order into another color order which indicates that the color density correction data creating process for the to-be-used color should be performed ahead of colors other than the to-be-used color.

The process for changing the color order in S210 will be described with two examples (1) and (2).

In the example (1), it will be assumed that the initial color order was set to the order C, M, Y, and K and that page data using only the color K was received from the PC 2 after the printer 1 has completed the color density correction data creating process for the second color M. In other words, when the color density correction data was created for C and M but not for Y and K, the printer 1 receives the image formation request corresponding to the page data having only K as the to-be-used color.

Therefore, the control unit 90 changes the color order to C, M, K, and Y, thus advancing the place of K in order to give priority to the to-be-used color, and stores the modified color order in the NVRAM 94. Subsequently, the control unit 90 returns to S203 and performs the color density correction data creating process for the to-be-used color K.

In the example (2), it will be assumed that the initial color order is set to C, M, Y, and K and that a page corresponding to the page data configured of black and red is received from the PC 2 (in other words, the page data having the to-be-used colors K, Y, and M is received from the PC 2) after the printer 1 has completed the color density correction data creating process for C and M.

In the example (2), the control unit 90 has not yet performed the color density correction data creating process for both to-be-used colors Y and K. Therefore, the control unit 90 does not reset the color order in S210 since all remaining colors Y and K for which the color density correction data have not been created are the to-be-used colors. Hence, the control unit 90 creates the color density correction data for next color Y in accordance to the color order C, M, Y, and K.

As described above, the control unit 90 changes the color order in S210 into the other color order giving priority of creating color density correction data to the to-be-used colors needed in the current printing process. If all colors for which color density correction data has not yet been created are required for the printing operation, in other words, if all colors for which color density correction data has not yet been created are the to-be-used colors, then the control unit 90 does not change the color order and continues creating color density correction data in the color order.

However, if the control unit 90 determines that the color density correction data creating process been completed for all to-be-used colors (S207: YES), the control unit 90 performs the printing process in S208.

Figure 8:
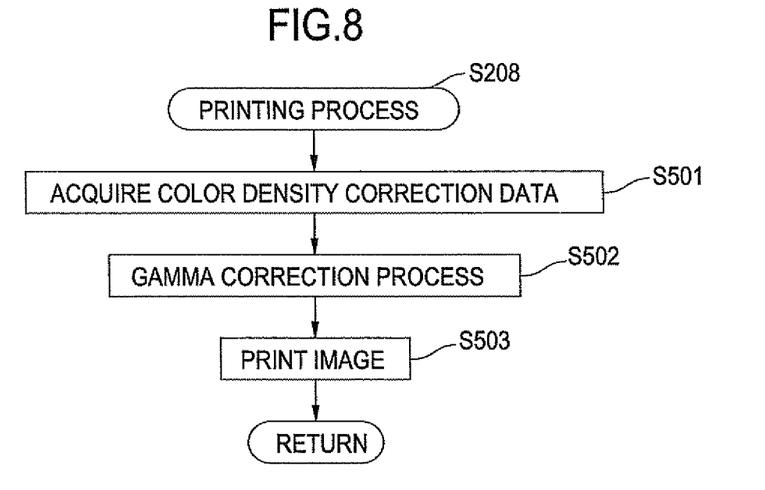
FIG. 8 is a flowchart describing a printing process in the main process.

Next, the printing process will be described with reference to FIG. 8. In S501 at the beginning of the printing process, the control unit 90 acquires the color density correction data corresponding to the to-be-used colors from the NVRAM 94.

In S502 the control unit 90 performs a gamma correction process to reflect the color density correction data for all to-be-used colors in the page data. Specifically, the control unit 90 corrects the page data by using the relevant color density correction data so that the image forming unit 9 forms an image having actual densities matching the densities for part of the page data.

In S503 the control unit 90 prints an image for one page on a sheet of paper 5 based on the page data after performing other required processes, such as a dithering process. During the printing operation, the printer 1 adjusts the pulse widths of the laser beams and voltages applied to the developing rollers 37 and chargers 45 based on the correction values reflected in the gamma correction process in order to calibrate the densities of to-be-used colors. And then, the control unit 90 returns to main process shown in FIG. 4.

Returning to FIG. 4, in S209 the control unit 90 determines whether or not, all received page data has been printed. Hence, the control unit 90 performs the processes of S206 through S209 for one page worth's image data at a time until all pages have been printed based on all page data that has been already received from the PC 2. When all pages have been printed (S209: YES), the control unit 90 advances to S205. Subsequently, the control unit 90 determines whether or not the color density correction data has been created for all color C, M, Y, and K in S205. The control unit 90 continues the color density correction data creating process for the remaining colors if the color density correction data creating process was not completed for all primary colors (S205: NO), or ends the main process if color density correction data has been created for four primary colors (S205: YES).

As described above, the control unit 90 determines whether or not all pages have been printed based on the page data received from the PC 2 in S209. When the control unit 90 determines that all pages have not been printed based on all page data (S209: NO), the control unit 90 returns to the color determination process of S206. Therefore, the printer 1 can create color density correction data efficiently by performing the color determination process in S206 for page data (one page's worth of image data) when the image data corresponding to the drawing data includes a plurality of page's worth of image data and the to-be-used colors differ among these pages.

As described above, when an image formation request is received during the color density correction data creating process, the printer 1 according to the first embodiment proceeds with the operation to form images based on color density correction data if the color density correction data was already created for the used colors constituting the page data. Accordingly, the printer 1 can form images accurately and quickly when color density correction data relevant to the image has already been created.

Further, if the color density correction data for all to-be-used colors has not been created, the control unit 90 changes order of colors for which the color density correction data is created to give priority to the to-be-used colors determined in S206, thereby quickly completing the creation of color density correction data for to-be-used colors corresponding to the page data.

Figure 9:
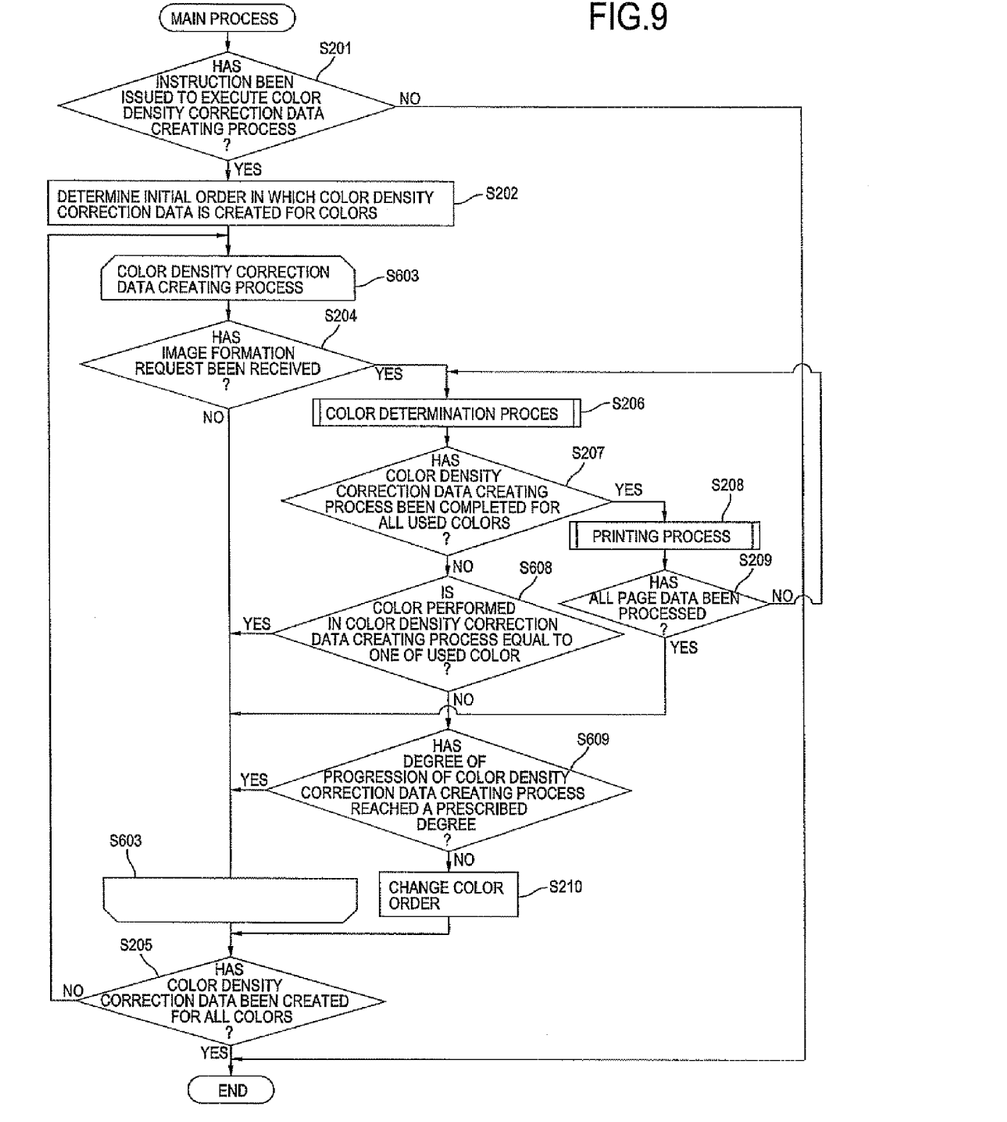
FIG. 9 is a flowchart describing a main process according to a second embodiment.

Next, a main process executed by a printer 1 according to a second embodiment will be described with reference to FIG. 9. The printer 1 according to the second embodiment has the same mechanical and electrical structure as the printer 1 according to the first embodiment Further, processes of S201-S202 and S205-S210 in a main process according to the second embodiment shown in. FIG. 9 are identical to the processes of S201-S202 and S205-S210 in FIG. 4 in the main process according to the first embodiment, and a detail description of the processes of S201-S202 and S205-S210 will not be repeated.

When an instruction is issued to execute color density correction data creating process (S201: NO), the control unit 90 determines the initial color order by reading the color order from the RAM 93 (S202). In S603, the control unit 90 creates color density correction data for colors C, M, Y, and K in the color order. The color density correction data creating process is basically the same as that of S203 in the first embodiment Specifically, in S603 the control unit 90 performs the same color density correction data creating process (S203, FIG. 5) described in the first embodiment and monitors continuously incoming data to determine whether an image formation request was received from the PC 2 in S604 during the color density correction data creating process shown in FIG. 5. When the control unit 90 determines that an image formation request is received from the PC 2 (S204: YES), in S206 the control unit 90 performs the color determination process described in the first embodiment. And then, when the control unit 90 determines that color density correction data was already created fox the to-be-used colors (S207: YES), the control unit 90 performs the processes in S208 and S209.

However, when the control unit 90 determines that color density correction data has not been created for all to-be-used colors (S207: NO), then in S608 the control unit 90 determines whether or not one of the to-be-used colors is one of colors corresponding to the density correction data that is being created by the control unit 90 when the image formation request is received (therefore, referred as "current color"). In other words, the current color is a color for which the control unit 90 is presently performing the color density correction data creating process. If the control unit 90 determines that the current color is one of the to-be-used colors (S608: YES), then the control unit 90 returns to S603 and continues performing the color density correction data creating process for the current color. If the current color is not the to-be-used color (S608: NO), the control unit 90 advances to S609.

In S609 the control trait 90 determines whether or not a degree of progression of the color density correction data creating process has reached a prescribed degree. If the control unit 90 determines that the degree of progression has not reached the prescribed degree (S609: NO), the control unit 90 cancels and stops performing the color density correction data creating process for the current color, and changes the color order in S210. However, if the control unit 90 determines that the degree of progression has reached the prescribed degree (S609: YES), the control unit 90 returns to S603 and continues the color density correction data creating process for the current color.

Specifically, the control unit 90 determines, in S609, whether or not at least half of the density patch set 32 has been formed on the photosensitive belt 33 with the image-forming unit 9 in S301 (see FIG. 5), and determines that the degree of progression has reached the prescribed degree when the control unit 90 determines that at least half of the density patch set 32 has been formed.

As described above, the control unit 90 determines density values for 256 color levels from 0% to 100% density using an interpolation method well known in the art (linear interpolation or quadratic curve interpolation) based on measured values for density patches. Accordingly, irregularities in the color density correction data may occur when the number of density patches constituting the density patch set 32 is too small. In other words, irregularities produced according to the interpolation method can be reduced by increasing the number of density patches formed on the photosensitive belt 33 to create more accurate color density correction data. However, increasing the number of density patches may unnecessarily increase the time required to create the color density correction data.

Therefore, when much time is required for the image-forming unit 9 to form the density patch set 32 due to the large number of density patches constituting the density patch set 32, the color density correction data creating process can be performed more effectively by determining whether or not the degree of progression of color density correction data creating process has reached a prescribed degree based on a degree of progression of forming the density patch set 32.

Figure 5:
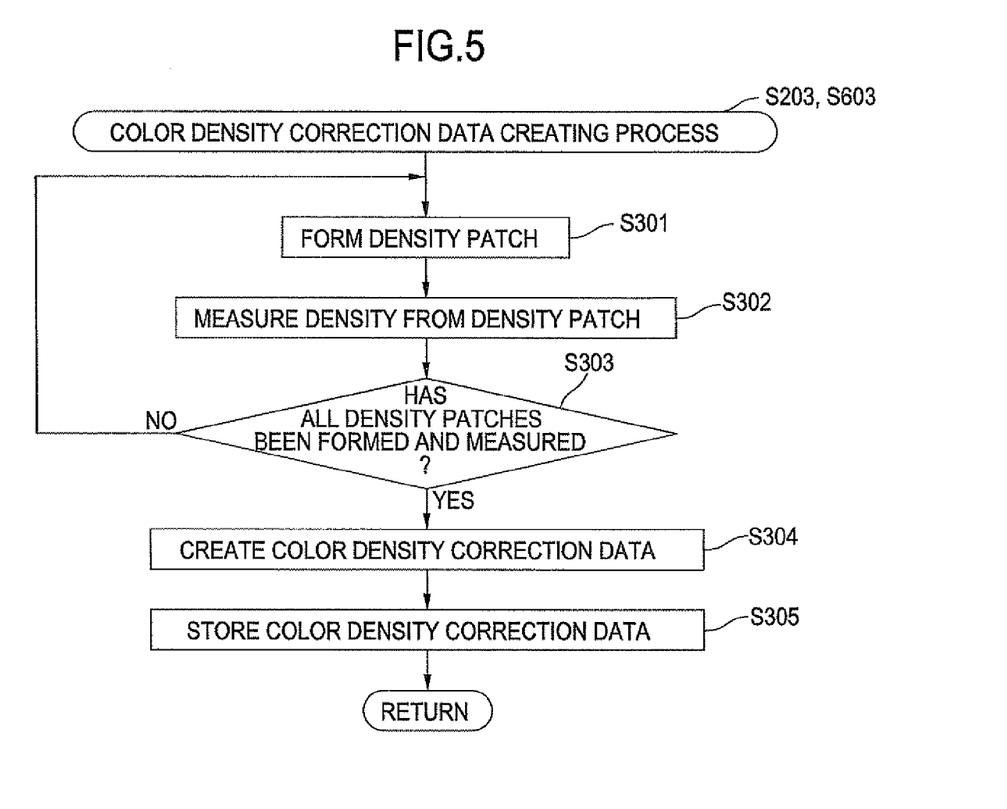
FIG. 5 is a flowchart describing a color density correction data creating process in the main process.
Figure 6:
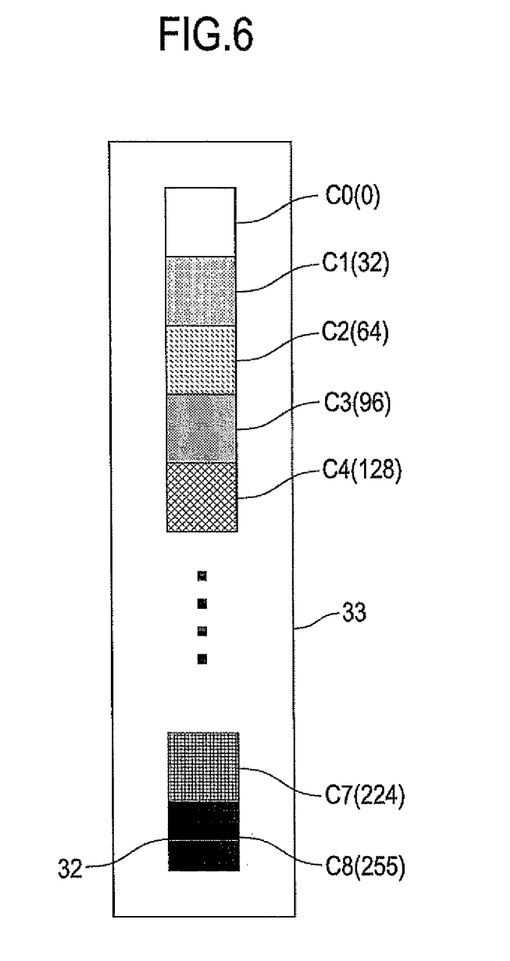
FIG. 6 shows examples of test images formed in the color density correction data creating process.

Further, the control unit 90 may also determine whether or not a degree of progress of the color density correction data creating process has reached the prescribed degree by determining whether or not the control unit 90 has already completed the processes for the current color to form density patches and to measure the densities of the patches in S301 and S302 (see FIG. 5). Since the control unit 90 continues performing the color density correction data creating process when the control unit 90 has completed measuring of densities for the density patches, it is prevent from wasting the measured results by canceling the color correction data creating process in the middle.

Here, the main process according to the second embodiment will be described by using two examples (3) and (4). In the example (3), it is assumed that a page that should be printed based on the page data is configured of black and red, that the initial color order for creating correction data is K, Y, M, and C, that the control unit 90 determines in S204 that an image formation request was received from the PC 2 after color density correction data for the first color K has created (S603), and that the control unit 90 is currently creating color density correction data for the second color Y.

Since a page that should be printed based on the page data is configured of the colors black and red, in S206 the control unit 90 determines that the to-be-used colors are K, Y, and M. In S207 the control unit 90 determines that color density correction data creating process has hot yet been performed for the to-be-used colors Y and M (S207: NO), and advances to S608. In $608 the control unit 90 determines that the current color Y is the same as one of the to-be-used colors (S608: YES), and the control unit returns to S603 to continue the color density correction data creating process for Y.

After completing the color density correction data creating process for Y, in S205 the control unit 90 determines that color density correction data has not been created for all to-be-used colors (S205: NO) and returns to S603 to create color density correction data for the third color M based on the color order stored in the NVRAM 94. Since the image formation request was received prior to starling the color density correction data creating process for the current color M, the control unit 90 determines that the image formation request was received from the PC 2 (S204: YES) before performing the process to form the density patch set 32. The control unit 90 determines that magenta is to-be-used color through the color determination process (S206), that color density correction data creating process has not yet been performed for M (S207: NO), and that current color M is the same as the to-be-used color (S608: YES). And then, the control unit 90 returns to S603 to complete performing the color density correction data creating process for the current color M.

Subsequently, the control unit 90 again determines that color density correction data has not yet been created for all colors (S205: NO) and returns to S603 to create color density correction data for the final color C. Since the image formation request was received prior to starting the color density correction data creating process for C, the control unit 90 determines that the image formation request was received from the PC 2 (S204: YES) before performing the process to form the density patch set 32 for C.

After performing the color determination process in S206, the control unit 90 again determines in S207 whether color density correction data has been created for all to-be-used colors. At this time, color density correction data creating process has been already completed for all to-be-used colors K, Y, and M (S207: YES). Accordingly, the control unit 90 fails to perform the color density correction data creating process for C and executes the printing process in S208. After completing the printing process for all pages (S209: YES), the control unit 90 returns to S603 (S205: NO) and creates the color density correction data for the final color C.

Next, as the example (4), it will be described when page corresponding to the page data is configured of the colors black and cyan. In the example (4), the control unit 90 sets the initial color order to K, Y, M, and C in S202, and in S204 the control unit 90 determines that an image formation request is received from the PC 2 after color density correction data creating process has already completed for the first color K in S603 and during the color density correction data creating process for the second color Y.

As the example (3) described above, the control unit 90 determines that an image formation request has been received from the PC 2 at this time (S204: YES) and in S206 determines K and C as the to-be-used colors. In S207 the control unit 90 determines whether or not color density correction data has been created for both to-be-used colors K and C. While color density correction data creating process has been already performed for to-be-used color K, the color density correction data creating process has not been completed for the to-be-used color C (S207: NO). Therefore, the control unit 90 advances to S608. Since the current color Y is different from the to-be-used color (S608: NO), the control unit 90 advances to S609.

In S609 the control unit 90 determines whether or not the degree of progression of the color density correction data creating process for the current color Y has reached to the prescribed degree. If the control unit 90 determines that the degree of progression of the color density correction data creating process fox Y (S609: NO), the control unit 90 cancels the color density correction data creating process for Y and changes the color order Into another color order which indicates that the color density correction data creating process for the to-be-used color should be performed ahead of colors other than the to-be-used color (S210). However, if the control unit 90 determines that the degree of progression of the color density correction data creating process for the current color Y has reached the prescribed degree (S609: YES), the control unit 90 returns to S603 to complete creating of color density correction data for the current color Y.

In the second embodiment described above, the control unit 90 can stop performing the color density correction data creating process for the current color, when an image formation request is received after the control unit 90 has already completed the color density correction data for the to-be-used colors. Therefore, the printer 1 can complete the printing process more quickly.

Further, even if the current color is different from all to-be-used colors, the printer 1 may continue perforating the color density correction data creating process for the current color if the degree of progression of color density correction data creating process has already reached the prescribed degree. Hence, the printer 1 can prevent from wasting the color density correction data that has been already created in the color density correction data creating process. If the degree of progression of the color density correction data creating process for the current color has reached the prescribed degree and the current color is not the to-be-used color, the printer 1 stops perforating the color density correction data creating process and resets the color order so that the color density correction data creating process for the to-be-used color should be performed ahead of colors other than the to-be-used color. Accordingly, the printer 1 can form images more quickly.

In both the first and second embodiments, the initial color order in which color density correction data is created (S202) is preferably set to black, yellow, magenta, and cyan or black, magenta, yellow, and cyan, because the colors constituting image data most commonly inputted from the PC 2 into the printer 1 are simply black for monochrome (the used color K) printing or black and red (the used colors K, Y, and M). Accordingly, the printer 1 can perform the printing process more efficiently by performing color density correction creating process in color order of black, magenta, and yellow.

While the invention has been described in detail with reference to the first and second embodiments thereof, it would be apparent to those skilled in the art that various changes and modifications may be made therein without departing from the spirit, of the invention.

For example, while the first and second embodiments are described for a four-color laser printer, the present Invention may also be applied to a color laser printer having two, six, or n (where n is an integer greater than or equal to 2) colors. Further, the present invention may also be applied to a tandem-color laser printer.

Further, while the printer 1 performs a color determining process by analyzing the color information from image data in the first and second embodiments, the PC 2 may analyze the color information from the page data and transmit the color information with the page data to the printer 1. In this case, the printer 1 may acquire the color information transmitted from the PC 2, and determine the to-be-used color based on the color information.

What is claimed is:

1. An image foaming device comprising:
    an image forming unit configured to form an image based on image data by using at least one of at least four colors of developer;
    a test image forming unit configured to control the image forming unit to form a test image based on test image data;
    a measuring unit configured to measure density of the test image;
    a color density correction data creating unit configured to create the color density correction data based on the measured density;
    a color order setting unit configured to set a color order;
    a performing unit configured to perform a color density correction data creating process for the at least four colors one by one in the color order to create color density correction data for the at least four colors, by controlling the test image forming unit, the measuring unit, and the color density correction data creating unit;
    a print image data acquiring unit configured so as to be capable of acquiring print image data while the performing unit is presently performing a color density correction data creating process for a current color of the at least four colors;
    a to-be-used color determination unit configured to determine, based on the print image data, a to-be-used color among the at least four colors, the to-be-used color being a color that should be used for forming a print image based on the print image data by the image forming unit;
    a first determining unit configured to determine whether or not the performing unit has already performed the color density correction data creating process for the to-be-used color; and
    a print image forming unit configured to control the image forming unit to form the print image based on the print image data by using the color density correction data corresponding to the to-be-used color, when the print image data acquiring unit acquires the print image data before the performing unit has performed the color density correction data creating process for all of the at least four colors after the performing unit started performing the color density correction data creating process and when the first determining unit determines that the performing unit has already performed the color density correction data creating process for the to-be-used color;
    wherein the performing unit continues to perform the color density correction data creating process to completion to create the color density correction data for one of the at least four colors before the print image forming unit controls the image forming unit to form the print image if the performing unit is performing the color density correction data creating process for the one of the at least four colors when the print image data acquiring unit acquires the print image data and the first determining unit determines that the performing unit has already performed the color density correction data creating process for the to-be-used color, and
    wherein the performing unit does not start performing the color density correction data creating process to create the color density correction data for one of the at least four colors and the print image forming unit controls the image forming unit to start forming the print image if the performing unit has not yet started to perform the color density correction data creating process for the one of the at least four colors when the print image data acquiring unit acquires the print image data and the first determining unit determines that the performing unit has already performed the color density correction data creating process for the to-be-used color.

2. The image forming device according to claim 1, further comprising a color density correction data storing unit that stores the color density correction data;
    wherein the first determining unit determines whether or not the color density correction data storing unit stores the color density correction data for the to-be-used color; and
    wherein the print image forming unit controls the image forming unit to form the print image based on the print image data by using the color density correction data corresponding to the to-be-used color, when the first determining unit determines that the color density correction data storing unit stores the color density correction data for the to-be-used color.

3. The image forming device according to claim 1, wherein when the first determining unit determines that the performing unit has not yet performed the color density correction data creating process for the to-be-used color, the color order setting unit resets the color order into another color order which indicates that the color density correction data creating process for the to-be-used color should be performed ahead of color for which the performing unit has not yet performed the color density correction data creating process and which is different from the to-be-used color.

4. The image forming device according to claim 1, wherein when the first determining unit determines that the performing unit has already created the color density correction data creating process for the to-be-used color, the print image forming unit controls the image forming unit to form the print image based on the print image data by using the color density correction data corresponding to the to-be-used color after the performing unit completes performing the color density correction data creating process for the current color.

5. The image forming device according to claim 1, wherein when the first determining unit determines that the performing unit has already performed the color density correction data creating process for the to-be-used color, the performing unit stops performing the color density correction data creating process for the current color and the print image forming unit controls the image forming unit to form a print image based on the print image data by using the color density correction data corresponding to the to-be-used color.

6. The image forming device according to claim 5, further comprising a second determining unit that determines whether or not the current color is the same as the to-be-used color, when the first determining unit determines that the performing unit has not yet performed the color density correction data creating process for the to-be-used color;

wherein the performing unit continues performing the color density correction data creating unit for the current color when the second determining unit determines that the current color is the same as the to-be-used color, and wherein when the second determining unit determines that the current color is different from the to-be-used color, the performing unit stops performing the color density correction data creating process for the current color and the color order setting unit resets the color order into another color order which indicates that the color density correction data creating process for the to-be-used color should be performed ahead of color for which the performing unit has not yet performed the color density correction data creating process and which is different from the to-be-used color.

7. The image forming device according to claim 6, further comprising a third determining unit that determines whether or not a degree of progression of performing the color density correction data creating process for the to-be-used color has reached a prescribed degree, when the second determining unit determines that the current color is different from the to-be-used color;

wherein the performing unit continues creating the color density correction data creating process for the current color when the third determining unit determines that the degree of progression of performing the color density correction data creating process for the current color has reached the prescribed degree, and wherein when the third determining unit determines that the degree of progression of performing the color density correction data creating process for the current color has not yet reached the prescribed degree, the performing unit stops performing the color density correction data creating process for the current color and the color order setting unit resets the color order into another color order which indicates that the color density correction data creating process for the to be used color should be performed ahead of color for which the performing unit has not yet performed the color density correction data creating process and which is different from the to-be-used color.

8. The image forming device according to claim 7, wherein the third determining unit determines that the degree of progression of performing the color density correction data creating process for the current color reaches the prescribed degree when the test patch forming unit completes forming a test image for the current color.

9. The image forming device according to claim 7, wherein the third determining unit determines that the degree of progression of performing the color density correction data creating process for the current color reaches the prescribed degree, when the measuring unit completes measuring density of a test image for the current color.

10. The image forming device according to claim 1, wherein the print image data acquiring unit acquires a plurality of pages' worth of print image data; and wherein the to-be-used color determination unit determines the to-be-used color for each page's worth of print image data.

11. The image forming device according to claim 1, wherein the plurality of colors of developer include cyan developer, magenta developer, yellow developer, and black developer;

wherein the color order setting unit initially sets an order in which black, yellow, magenta, and cyan are arranged, as the color order.

12. The image forming device according to claim 1, wherein the plurality of colors of developer include cyan developer, magenta developer, yellow developer, and black developer;

wherein the color order setting unit initially sets an order in which black, magenta, yellow, and cyan are arranged, as the color order.

13. The image forming device according to claim 1, wherein the to-be-used color determination unit determines at least one to-be-used color among the plurality of colors of developer based on the print image data.

14. An image forming method comprising:

starting a color density correction data creating process for at least four colors one by one in a color order, the color density correction data creating process including:

controlling an image forming unit to form a test image based on test image data;

measuring density of the test image; and creating the color density correction data based on the measured density;

acquiring print image data while the color density correction data creating process is being performed for a current color of the at least four colors;

determining a to-be-used color among the at least four colors based on the print image data, the to-be-used color being a color that should be used for forming a print image based on the print image data by an image forming unit;

determining whether or not color density correction data creating process for the to-be-used color has already been performed; and controlling the image forming unit to foil the print image based on the print image data by using the color density correction data corresponding to the to-be-used color, when the print image data is acquired before the color density correction data creating process is performed for all of the at least four colors after the start of the color density correction data creating process, and when it is determined that the color density correction data creating process for the to-be-used color has already been performed, wherein the color density correction data creating process continues to complete creation of the color density correction data for one of the at least four colors before the image forming unit is controlled to form the print image, if the color density correction data creating process is being performed when the print image data is being acquired and the color density correction data creating process for the to-be-used color is determined to have been performed, and wherein the color density correction data creating process to create the color density correction data for one of the at least four colors is not started and the image forming unit is controlled to start forming the print image, if the color density correction data creating process has not yet started when the print image data is acquired and the color density correction data creating process for the to-be-used color is determined to have been performed.

15. A computer-readable storage device that stores a data processing program, the data processing program comprising instructions for:

starting performing a color density correction data creating process for at least four colors one by one in a color order, the color density correction data creating process including;

controlling an image forming unit to form a test image based on test image data;

measuring density of the test image; and creating the color density correction data based on the measured density;

acquiring print image data while the color density correction data creating process is being performed for a current color of the at least four colors;

determining a to-be-used color among the at least four colors based on the print image data, the to-be-used color being a color that should be used for forming a print image based on the print image data by an image forming unit;

determining whether or not color density correction data creating process for the to-be-used color has already been performed; and controlling the image totaling unit to form the print image based on the print image data by using the color density correction data corresponding to the to-be-used color, when the print image data is acquired before the color density correction data creating process is performed for all of the at least four colors after the start of the color density correction data creating process, and when it is determined that the color density correction data creating process for the to-be-used color has already been performed, wherein the color density correction data creating process continues to complete creation of the color density correction data for one of the at least four colors before the image forming unit is controlled to form the print image if the color density correction data creating process is being performed when the print image data is being acquired and the color density correction data creating process for the to-be-used color is determined to have been performed, and wherein the color density correction data creating process to create the color density correction data for one of the at least four colors is not started and the image forming unit is controlled to start forming the print image, if the color density correction data creating process has not yet started when the print image data is acquired and the color density correction data creating process for the to-be-used color is determined to have been performed.

* * * * *